United States Patent
Moreaud et al.

(10) Patent No.: US 10,290,123 B2
(45) Date of Patent: May 14, 2019

(54) METHOD OF SEGMENTING THE IMAGE OF AN OBJECT RECONSTRUCTED BY THREE-DIMENSIONAL RECONSTRUCTION

(71) Applicant: IFP Energies nouvelles, Rueil-Malmaison (FR)

(72) Inventors: Maxime Moreaud, Saint Martin la Plaine (FR); Francois Wahl, Chaponost (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/553,124

(22) PCT Filed: Jan. 26, 2016

(86) PCT No.: PCT/EP2016/051546
§ 371 (c)(1),
(2) Date: Aug. 23, 2017

(87) PCT Pub. No.: WO2016/134903
PCT Pub. Date: Sep. 1, 2016

(65) Prior Publication Data
US 2018/0033167 A1  Feb. 1, 2018

(30) Foreign Application Priority Data
Feb. 24, 2015  (FR) .................................... 15 51548

(51) Int. Cl.
*G06K 9/00* (2006.01)
*G06T 11/00* (2006.01)
(Continued)

(52) U.S. Cl.
CPC .......... *G06T 11/008* (2013.01); *G06K 9/4647* (2013.01); *G06T 7/11* (2017.01);
(Continued)

(58) Field of Classification Search
CPC combination set(s) only.
See application file for complete search history.

(56) References Cited

U.S. PATENT DOCUMENTS

| | | | |
|---|---|---|---|
| 6,337,927 B1 * | 1/2002 | Elad ...................... | G06K 9/6235 382/160 |
| 2007/0213950 A1 * | 9/2007 | Handa .................... | G01C 17/38 702/95 |

(Continued)

OTHER PUBLICATIONS

International Search Report for PCT/EP2016/051546 dated Aug. 3, 2016; English translation submitted herewith (5 pages).

(Continued)

*Primary Examiner* — Alex Kok S Liew
(74) *Attorney, Agent, or Firm* — Fitch, Even, Tabin & Flannery LLP

(57) ABSTRACT

The invention is a method for the segmentation of an object's image obtained by three-dimensional reconstruction. Based on an object's image represented by a finite number of intensity levels, the image is reconstructed based on projections acquired from different angles around the object, a distribution representative of the spread of the intensity levels in the image along a predetermined direction is determined, for at least one angle. Next, at least one intensity threshold is determined by minimizing an objective function estimating the difference between the actual measurement and a simulated measurement for the angle being considered with the simulated measurement being dependent on the threshold and the distribution. Next, the image is segmented by grouping the intensity levels into at least two classes defined by the threshold. The invention has a particular application to characterization of supports of catalysts for petrochemical refining.

14 Claims, 3 Drawing Sheets

(51) Int. Cl.
| | |
|---|---|
| G06T 7/11 | (2017.01) |
| G06T 7/136 | (2017.01) |
| G06K 9/46 | (2006.01) |
| G06K 9/62 | (2006.01) |
| G06T 7/00 | (2017.01) |

(52) U.S. Cl.
CPC ............ *G06T 7/136* (2017.01); *G06K 9/6267* (2013.01); *G06T 7/0004* (2013.01); *G06T 7/0012* (2013.01); *G06T 2207/10072* (2013.01); *G06T 2207/20048* (2013.01)

(56) References Cited

U.S. PATENT DOCUMENTS

| | | | |
|---|---|---|---|
| 2008/0118136 A1* | 5/2008 | Cai | G06K 9/38 382/131 |
| 2015/0054197 A1* | 2/2015 | Vecitis | B01D 71/68 264/299 |
| 2015/0363667 A1* | 12/2015 | Nakai | G06K 9/6256 382/159 |

OTHER PUBLICATIONS

Joost Batenburg K et al: "Optimal Threshold Selection for Tomogram Segmentation by Reprojection of the Reconstructed Image", Aug. 27, 2007 (Aug. 27, 2007), Computer Analysis of Images and Patterns; [Lecture Notes in Computer Science], Springer Berlin Heidelberg, Berlin, Heidelberg, pp. 563-570, XP019067446, ISBN: 978-3-540-74271-5, figure 1.

V.D. Tran: "Reconstruction et segmentation d'image 3D de tomographie electronique par approche "probleme inverse"", Oct. 14, 2013 (Oct. 14, 2013), Universite Jean Monnet—Saint-Etienne,Saint-Etienne, XP055237939, 3.3.1 Operateurs de projection etretro-projection simplifies; pp. 93-95, figure 3.16, figure 3.17.

V.D. Tran et al: "Inverse Problem Approach for the Alignment of Electron Tomographic series", IFP Energies nouvelles, BP 3, 69360 Solaize, France, Observatoire de Lyon, CRAL CNRS UMR 5574, Université de Lyon, France, Laboratoire Hubert Curien, UMR CNRS 5516, Université de Saint-Etienne, France.

V.D. Tran et al: "Robust registration of electron tomography projections without fiducial markers", IFP Energies nouvelles, BP 3, 69360 Solaize, France, Observatoire de Lyon, CRAL CNRS UMR 5574, Université de Lyon, France, Laboratoire Hubert Curien, UMR CNRS 5516, Université de Saint-Etienne, France.

V.D. Tran et al: "Joint Reconstruction and Refined Registration for Electron Tomography", IFP Energies nouvelles, BP 3, 69360 Solaize, France, Observatoire de Lyon, CRAL CNRS UMR 5574, Université de Lyon, France, Laboratoire Hubert Curien, UMR CNRS 5516, Université de Saint-Etienne, France.

Pekar V et al: "Fast detection of meaningful isosuifaces for volume data visualization", Proceedings Visualization 2001. Vis 2001. San Diego, CA, Oct. 21-26, 2001; [Annual IEEE Conference on Visualization], New York, NY : IEEE, US, Oct. 21, 2001 (Oct. 21, 2001), pp. 223-227, XP002246128, DOI: 10.1109/VISUAL.2001.964515, ISBN: 978-0-7803-7200-9, figure 1.

Van Aarle W et al: "Threshold Selection for Segmentation of Dense Objects in Tomograms", Dec. 1, 2008 (Dec. 1, 2008), Advances in Visual Computing, Springer Berlin Heidelberg, Berlin, Heidelberg, pp. 700-709, XP019112126, ISBN: 978-3-540-89638-8 p. 701, paragraph 4-paragraph 5, p. 708, paragraph 2.

Porikli Fatih: "Integral Histogram: A Fast Way to Extract Histograms in Cartesian Spaces", Proceedings/2005 IEEE Computer Society Conference on Computer Vision and Pattern Recognition, CVPR 2005 : [Jun. 20-25, 2005, San Diego, CA], IEEE, Piscataway, NJ, USA, vol. 1, Jun. 20, 2005 (Jun. 20, 2005), pp. 329-836, XP010817358, DOI: 10.1109/CVPR.2005.188, ISBN: 978-0-7695-2372-9, figure 3.

\* cited by examiner

METHOD OF SEGMENTING THE IMAGE OF AN OBJECT RECONSTRUCTED BY THREE-DIMENSIONAL RECONSTRUCTION

CROSS-REFERENCE TO RELATED APPLICATIONS

Reference is made to International Application No. PCT/EP2016/051546 filed Jan. 26, 2016, which is incorporated herein by reference in its entirety.

BACKGROUND OF THE INVENTION

Field of the Invention

The present invention relates to the three-dimensional reconstruction of an object on the basis of measurements external to the object, such as for example within the framework of electron tomography.

Description of the Prior Art

The term tomography refers to all of the exact, or usually approximate, procedures for reconstructing the interior of an object on the basis of measurements performed outside the object. These measurements, which are called projections in the field, are related to the absorption by the object of energy emitted by a source. Often, these measurements are performed by a sensor, and are carried out at various measurement angles around the object being considered. The sources used can be of several types: X rays, gamma rays, or electrons for electron tomography.

In the field of petrochemical refining, three-dimensional reconstruction is used to characterize the supports of catalysts. Indeed, morphological measurements of particles make it possible to ascertain the physico-chemical specifics of the materials being studied. With the aid for example of TEM (Transmission Electron Microscopy), a series of projections is carried out at regular angular intervals. Next, a tomographic reconstruction procedure is implemented, for example by an approach of the inverse problem type, so as to obtain an image of the support being considered.

Three-dimensional reconstruction can also be used in the field of oil exploration and exploitation, for the characterization of porous materials. Indeed, this technique provides access to the internal porous network of a rock sample, and consequently makes it possible to characterize the latter very precisely. Thus, this technique can make it possible to access very important information for the characterization of a reservoir rock, such as its porosity (density of pores in the sample), or else its permeability (pore inter-connectivity, potentially preferential in a direction).

The three-dimensional reconstruction of an object may also relate to very diverse fields such as the characterization of materials in general, non-destructive testing, or medical imaging.

The reconstructed object, or image of the object, is then presented in the form of a mockup, generally represented on a computer, via intensity levels with each intensity level reflecting a constituent of the object. For example, in the case of a catalyst support, some intensity levels will be able to represent the void and others the substance of the support. For rocks, each chemical constituent can be represented by intensity levels. The intensity levels are conventionally represented using a black and white color palette, leading to a grayscale representation. The user may then seek to simplify this information to allow characterizations of morphological or geometrical type (volume, area, specific surface area, length). Simplification is a reduction, without operator intervention, in the number of intensity levels representing the reconstructed object. Typically, a reconstructed object is represented by several thousand intensity levels for which it is desired to simplify the levels into two or three levels or classes. For example, in the case of the estimation of the porous volume of a rock, it will advantageously be possible to simplify the reconstructed image of the rock sample considered into two classes with one class corresponding to the void and the other corresponding to any constituent of the rock. A simplification step may also be implemented in the case where the image of the object comprises non-integer intensities, which will be grouped into a reasonable number of classes of integer intensities. In the technical field under consideration, segmentation refers to this simplification step. Segmentation therefore determines, intensity thresholds, marking intensity classes which are representative of a property that it is desired to bring to the fore.

A segmentation step can also be implemented on a digital image of an object with the projection then being calculated numerically, on a basis of the image, and is not obtained by experimental measurements.

The following documents will be cited in the course of the description:

[Batenburg et al. 2007] K. J. Batenburg and J. Sijbers. "Optimal Threshold Selection for Tomogram Segmentation by Reprojection of the Reconstructed Image", in: Computer Analysis of Images and Patterns, in: Lecture Notes in Computer Science, vol. 4673, Springer, Berlin/Heidelberg, 563-570, 2007.

[Batenburg et al. 2009] K. J. Batenburg and J. Sijbers. "Adaptive Thresholding of Tomograms by Projection Distance Minimization". Pattern Recognition, 42(10), 2297-2305, 2009.

[Doan D. H. et al., 2013]: Hong Doan Dinh, Pierre Delage, Jean-François Nauroy, Anh-Minh Tang, Youssef Souhail, Microstructural Characterization of a Canadian Oil Sand, Canadian Geotechnical Journal. 01/2013; 49(10).

[Gilbert 1972] Gilbert P., Iterative Methods for the Three-Dimensional Reconstruction of an Object from Projections. Journal of Theoretical Biology, 36(1):105-117.

[Huang et al. 1995] L. K. Huang and M. J. Wang, Image Thresholding by Minimizing the Measure of Fuzziness, Pattern Recognition, 41-51, 1995.

[Kapur et al. 1985] J. N. Kapur, P. K. Sahoo, A. K. C. Wong. "A New Method for Gray-Level Picture Thresholding Using the Entropy of the Histogram", Computer Vision, Graphics, and Image Processing, 29(3), 273-285, 1985.

[Lei et al. 2008] Lei He, Zhigang Peng, Bryan Everding, Xun Wang, Chia Y. Han, Kenneth L. Weiss, William G. Wee, A Comparative Study of Deformable Contour Methods on Medical Image Segmentation, Image and Vision Computing, Volume 26, Issue 2, 1 Feb. 2008, Pages 141-163.

[Mesanovic et al. 2013] Nihad Mesanovis, Haris Huseinagic, Samir Kamenjakovic, Automatic Region Based Segmentation and Analysis of Lung Volumes from C T Images, International Journal of Computer Science and Technology, vol. 4, Special issue, 2013.

[Moreaud et al. 2008] M. Moreaud, B. Celse, F. Tihay, Analysis of the Accessibility of Macroporous Alumino-Silicate using 3D-TEM images. Material Science and Technology 2008 conference, Pittsburgh USA.

[Otsu 1979] N. Otsu. "A Threshold Selection Method from Gray Level Histograms". IEEE Trans. Systems, Man and Cybernetics 9, 62-66, 1979.

[Stawiaski, 2008] Jean Stawiaski, Morphologie mathématique et graphes: Application à la Segmentation Interactive D'images Médicales, thesis, Ecole des Mines de Paris, 2008.

[Tran et al. 2013] V D Tran, M Moreaud, É Thiébaut, L Denis, J M Becker, Inverse Problem Approach for the Alignment of Electron Tomographic Series, Oil & Gas Science and Technology—Revue d'IFP Energies nouvelles 69 (2), 279-291.

[Tran 2013] V. D. Tran, Reconstruction et Segmentation d'image 3D de Tomographie Électronique par approche «Problème Inverse», Thesis, Université de Saint Etienne, 2013.

[Xu et al. 1996] L. Xu and M. I. Jordan, "On Convergence Properties of the E M Algorithm for Gaussian Mixture", Neural Computation, 8, 129-151, 1996.

The simplification, or segmentation, of the volumetric data without any manual intervention is conventionally performed with global approaches using a (non-cumulative) histogram of the reconstructed image, such as for example: maximization of interclass variance [Otsu 1979], maximization of entropy [Kapur et al. 1985], tailoring of multiple Gaussian distributions to the histogram [Xu et al. 1996], dynamic cluster (or k-means) procedures [Huang and Wang 1995]. It is also possible to use local approaches of an active contour type [Lei et al. 2008], region growth type [Mesanovic et al. 2013], or else arising from mathematical morphology using a watershed operator [Stawiaski, 2007]. These approaches may be fully automatic, semi-automatic, or guided by the user. Their major drawback resides in the fact that these procedures use the reconstructed object as an input, which is an approximation of the true object, comprising errors. These procedures are therefore not directly linked to the initial information on the object being studied, namely the projections.

To alleviate this problem, a specific procedure for tomography, based on a global optimization, was recently proposed by [Batenburg et al. 2007], and then by [Tran 2013]. The principle determines the values of the intensity thresholds that minimize, via an iterative optimization procedure, the difference between the actual projections (that is to say the projections actually recorded by the projection measurement tools) and those calculated on the basis of the reconstructed, and then segmented, object. This procedure is known as the procedure for minimizing the distance to the projections. FIG. 1 presents the principle of this procedure based on actual projections P, an image I of the object being studied comprising NI intensity levels, is reconstructed for example by tomographic reconstruction; and then on the basis of predefined values of intensity thresholds s, a segmented image IS of this reconstructed image I, comprising NS intensity classes, is calculated by a segmentation procedure S. Projections P' are thereafter calculated on the basis of this segmented image IS. Next, a comparison PCP' is carried out between the actual projections P and calculated projections P' on the segmented image IS; the values of intensity thresholds s are then updated, until the actual projections P and the calculated projections P' are as close as possible, that is to say until their difference is less than a predefined threshold.

This procedure, though it makes it possible to work on the initial information on the object being studied, consumes a great deal of calculation time. Indeed, for each iteration of the optimization process, that is to say at each updating s+Δs of the intensity threshold values, it is necessary to recalculate the projections P' of the segmented reconstructed object.

SUMMARY OF THE INVENTION

The present invention reduces the calculation times to obtain a simplified object by the procedure for minimizing the distance to the projections. Accordingly, the present invention rests on a pre-calculation, carried out just once, of the calculated projections P', making it possible to avoid the calculation of the calculated projections P' at each iteration of an optimization process.

The present invention relates to a method for the segmentation of an object's image represented by a finite number of intensity levels, the image having been reconstructed on the basis of measurements external to the object and acquired from various angles taken with respect to a reference. On the basis of a predefined number of intensity thresholds of the image, the method comprises the following steps for at least one of the angles:

a) determining a distribution representative of the spread of the intensity levels of the image along a predetermined direction in the image is determined, for the angle;

b) determining the values of the intensity thresholds by minimizing an objective function estimating the difference between the measurement for the angle and a simulated measurement for the same angle with the simulated measurement being dependent on the values of the thresholds and the distribution; and c) segmenting the image by grouping the intensity levels into intensity classes delimited by the values of the thresholds.

Advantageously, the predetermined direction can be a straight line parallel to one of the horizontal axes of said image.

Preferentially, the distribution can be a cumulative histogram of the intensity levels encountered in the image.

According to one embodiment of the invention, the measurements may have been acquired within the framework of a parallel acquisition geometry and the cumulative histogram may be determined on a rotation of the image according to the angle.

According to one mode of implementation of the present invention, it is possible to calculate the simulated measurement $P'_A$ for one of the angles A according to a formula of the type:

$$P'_A = f(T_A(s_1), \ldots, T_A(s_n), \ldots, T_A(s_{NS}))$$

where f is a linear combination, NS is the predefined number of the intensity thresholds, and $T_A(s_n)$ is the set of elements of the cumulative histogram that are representative of the number of the intensity levels of the image that are less than a threshold value $s_n$ with the histogram being calculated for the angle A.

According to one mode of implementation of the present invention, it is possible to determine a representative intensity for each of the classes defined by the values of the thresholds.

According to one mode of implementation of the present invention, the intensity representative of the class can be the value of one of the thresholds defining the class, a mean of the values of the thresholds delimiting the class, or any linear combination of the values of the thresholds defining the class.

According to one embodiment of the invention, it is possible to apply steps a) and b) for each of the measurement angles and it is possible to determine threshold values representative of the set of the angles by choosing either the median, or a combination of the values of the thresholds determined for each of the measurement angles.

According to another embodiment of the invention, it is possible to determine threshold values representative of the set of the measurement angles by minimizing an objective function estimating the differences between the measurements and the simulated measurements for the set of the measurement angles.

Moreover, the invention relates to a use of the method according to the invention for the characterization of catalyst supports in the field of petrochemical refining.

Furthermore, the invention relates to a use of the method according to the invention for the characterization of the porous media in the field of oil exploration and exploitation.

Additionally, the invention relates to a use of the method according to the invention for the characterization of materials, for the non-destructive testing of an object, or for medical imaging.

Furthermore, the invention relates to a computer program product downloadable from a communication network and/or recorded on a tangible medium readable by a computer and/or executable by a processor, comprising program code instructions for the implementation of the method, when the program is executed on a computer.

BRIEF DESCRIPTION OF THE DRAWINGS

Other characteristics and advantages of the method according to the invention will become apparent on reading the description hereinafter of nonlimiting examples of embodiments, while referring to the figures appended and described hereinafter.

DETAILED DESCRIPTION OF THE INVENTION

Figure 1:
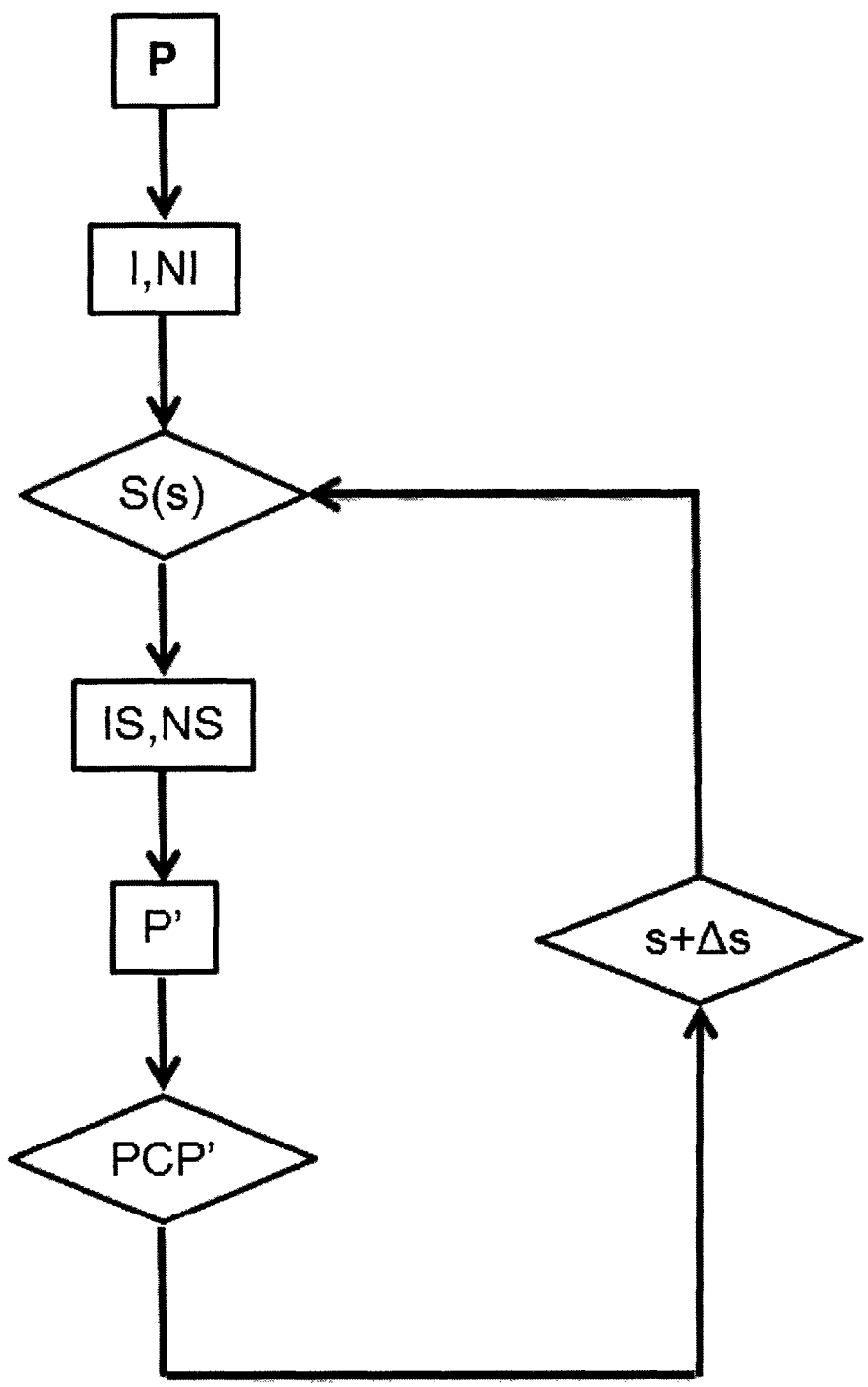
FIG. 1 is a diagram of the principle of the segmentation procedure by minimization of the distance to the projections.

The following definitions are used in the course of the description of the invention:
projections: In the field of three-dimensional reconstruction, they are off-board measurements outside the object and acquired from various measurement angles taken with respect to a reference. These measurements result from the emission of energy from a source, partially absorbed by the object being studied with the remaining energy being recorded by a sensor. The sources used can be of several types: X rays, gamma rays, or else electrons for electron tomography. These measurements are generally repeated for various measurement angles taken with respect to a reference. In X-ray tomography, it is commonplace to use 720 projections, at 360° around the object, in increments of 0.5°. In electron tomography, the projections are carried out from −70° to +70°, in increments of 1°.
three-dimensional reconstruction: This is a technique for constructing the volumetric image of an object on the basis of projections of this object, carried out at various measurement angles. The reconstruction leads to an image represented by a finite number of intensity levels with each level corresponding to a constituent of the object. In general, a constituent is represented by several intensity levels. More information relating to three-dimensional reconstruction can be found in [Doan D. H. et al., 2013].
parallel/non-parallel acquisition geometry: This is the geometry of radiation of the source of a device for acquiring projections. One speaks of non-parallel or else conical geometry when the source emits from a point and when the rays passing through the object are not parallel. One speaks of parallel geometry when the source emits rays, all of which are parallel, from a finite surface and when these rays pass through the object along the same direction which is the case for example in electron tomography.
intensity class: This is a grouping of intensity levels that are determined from at least one threshold and characterized by an intensity representative of the intensity values of the class. For example, a class can group together the intensity values that are less than a given threshold, the intensity values that are greater than another threshold, or the values that lie between two thresholds. The intensity representative of a given class can correspond to the mean of the intensity values of the class being considered, to the median, to one of the thresholds characterizing the class, or else be defined by any other calculation.
segmentation: The segmentation of an image represented by a finite number of intensity levels groups the intensity levels in question into intensity classes.

The subject of the present invention is a method for segmenting an object's image represented by a finite number of intensity levels. According to the invention, the image being considered has been reconstructed on the basis of measurements external to the object and acquired from various angles taken with respect to a reference, which can be a vertical axis. Hereinafter and in accordance with usage in the field, these measurements are called projections. The subject of the invention is aimed at grouping the intensity levels into a predefined number of intensity classes, doing so by determining, in an automatic, fast manner, and by taking account of the projections, the values of the intensity thresholds, defining the classes in question.

Prior to its implementation, the method according to the invention may require that the following two steps be carried out:

1. Acquisition of the Projections

This entails acquiring the input data for performing three-dimensional reconstruction of an object. Knowledge of the techniques for acquiring projections associated with an object is known.

Within the framework of three-dimensional reconstruction by electron tomography, it is possible to obtain projections of this type by using a Transmission Electron Microscope (TEM). The TEM comprises an electron gun which dispatches a parallel electron beam of high energy onto an object disposed on an object-holder. The object then disperses the electrons which pass through it; the outgoing beam is thereafter refocused, and then recorded by a sensor. The recorded signal is called a projection; it will be denoted P hereinafter. This operation is repeated while inclining the object-holder of the microscope at various angles with respect to the electron beam (typically from −70° to +70° with an increment of 1°). Projections $P_A$ are thus obtained for NA measurement angles A. Thus, the projections contain the volumetric information on an object, projected onto a plane. The TEM makes it possible to obtain information on an object at a scale of from a few nanometers to an angström.

Conventionally, the projections can also be acquired by X rays, gamma rays or analogous rays.

2. Three-Dimensional Reconstruction

This entails, based on the projections $P_A$ acquired in the previous step for various measurement angles A, reconstructing the three-dimensional image, that is the volumetric image, of an object. Knowledge of techniques of three-dimensional reconstruction of an object is available. The reconstruction can be carried out by successive sectional planes, and then the final reconstructed volume is obtained by superposition of the reconstructed sections. A particular tomographic reconstruction procedure is for example described in [Tran et al. 2013]. It is also possible to cite the SIRT procedure [Gilbert, 1972], commonly used in the field. The resolution of the object's image obtained by three-dimensional reconstruction depends in particular on the quality of the sampling in measurement angles (range of measurement angles that is considered, and increment between measurements). Thus, the more complete the angular coverage and the smaller the angular increment, the more precise the image of the reconstructed object and the closer the image of the object is to the actual object. Within the framework of projections obtained by TEM, it is necessary beforehand to apply a correction to the projections, because of a displacement of the object in the object-holder during the successive angular measurements.

Based on a number of intensity thresholds that are predefined, the present invention comprises at least the following steps for a given measurement angle:

1. Calculation of a distribution representative of the spread of the intensity levels In the course of this step, a distribution representative of the spread of the intensity levels of the image along a predetermined direction in the image is determined, for the angle;
2. Estimation of the values of the intensity thresholds In the course of this step, the value of the intensity thresholds is determined by minimizing an objective function estimating the difference between the measurement for the angle and a simulated measurement for the same angle with simulated measurement being dependent on the value of the thresholds and the distribution;
3. Segmentation of the image In the course of this step, the image is segmented by grouping the intensity levels into classes delimited by the threshold values.

For the sake of simplification, the main steps of the method according to the invention are presented in the case of the image of a two-dimensional object. However, the same principle can readily be implemented in three dimensions. Thus, hereinafter, an image I of an object in two dimensions is considered, of size W×H, having NI intensity levels. An element I(i,j) (or mesh cell) of the image I is an element situated at the crossover of the $i_{th}$ column of I and of the $j^{th}$ row of I, with i varying between 1 and W and j varying between 1 and H. An element I(i,j) of the image I contains a given intensity value. The image I has been obtained by three-dimensional reconstruction based on projections $P_A$ of the object carried out at a number NA of different measurement angles A.

Moreover, the main steps of the method according to the invention are presented hereinafter in the case of the segmentation of an image I into NS+1 intensity classes. That is in the general case where it is sought to determine a number NS of values of intensity thresholds, the number NS of thresholds is an integer greater than or equal to 1, which is predefined.

The main steps of the present invention are detailed hereinafter.

1) Calculation of a Distribution Representative of the Spread of the Intensity Levels In the course of this step, a calculation is made of a distribution representative of the spread of the intensity levels encountered in the image I along a predetermined direction.

According to a preferred embodiment of the present invention, the distribution is the cumulative histogram T of the intensity levels encountered in the image I along a predetermined direction. According to one embodiment of the present invention, the predetermined direction is a horizontal straight line in the image I.

According to one embodiment of the present invention, a cumulative histogram $T_A$ is calculated for each of the NA measurement angles.

According to one embodiment for which the projections have been acquired via a parallel acquisition geometry, the calculation of a cumulative histogram $T_A$ for a given angle A can proceed according to the following two sub-steps:

1.1 Calculation of a Rotation I' of the Image I According to the Angle A:

This entails, initially, calculating a rotation I' of the image I for the measurement of angle A being considered. The image I' obtained after rotation of the image I has the same dimensions as the image I.

According to one embodiment of the present invention, the rotation I' of an image I according to an angle A can be carried out in the manner described hereinafter. Each point I(i',j') of the image after rotation I' is obtained from a point I(i,j) of the image I through the following relation:

$$I'(i',j')=I(i,j)$$

with i=(i'−ic)·cos(A)−(j'−jc)·sin(A)+ic,
j=(i'−ic)·sin(A)+(j'−jc)·cos(A)+jc and (ic,jc) are the coordinates of the center of the image I.

According to one embodiment of the present invention, when the coordinates (i,j) are not integer, an interpolation is employed to estimate the value I(i,j) of the image I at the point (i,j). According to one mode of implementation of the invention, the interpolation that is used can be bilinear, or involve B-spline functions, preferentially cubic. Denoting by Interpolation( ) the chosen interpolation function, ceil( ) a function which associates, with a real number, the immediately higher integer, and floor( ) a function which associates, with a real number, the immediately lower integer, the expression for the value I(i,j) of the image I at the point (i,j) can be expressed in the following manner:

$$I(i,j)=\text{Interpolation}(I(\text{cell}(j),\text{cell}(i)),I(\text{cell}(j),\text{floor}(i)),I(\text{floor}(j),\text{cell}(i)),I(\text{floor}(j),\text{floor}(j))$$

1.2 Calculation of a Cumulative Histogram T of the Intensity Levels on the Image I'

Next, subsequently, the calculation is undertaken of the cumulative histogram $T_A$ of the intensity levels encountered, c, in the image I' obtained after rotation of the image I.

Figures 2A, 2B:
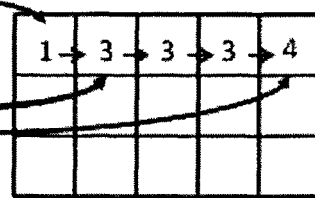
FIGS. 2A to 2F present the principle, according to the invention, of the calculation of a distribution representative of the spread of the intensity levels in an image along a horizontal line with the distribution being a cumulative histogram.
Figures 2C, 2D:
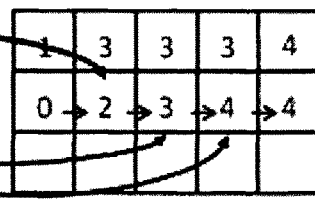
Figures 2E, 2F:
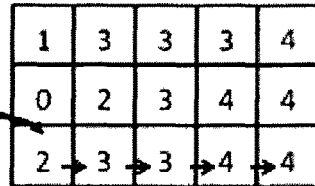

According to a preferential mode of implementation of the invention, the favored direction is a straight line parallel to one of the rows j of the image I', and the aggregate of the intensities is then calculated along a line j of this image. A cumulative histogram of dimension NI×H is thus defined, and an element $T_A(i, j)$ of the cumulative histogram contains the number of mesh cells of the line j of the image after rotation I' whose intensity is less than or equal to i. An exemplary histogram of the aggregated intensities is given in FIG. 2. FIGS. 2A and 2B show the mechanism for filling the first row of the cumulative histogram, FIGS. 2C and 2D show the mechanism for filling the second row and FIGS. 2E and 2F show the mechanism for filling the third row. FIGS. 2A, 2C, and 2E present the intensity values of the image I', composed of 3 rows, 4 columns and of 5 integer intensity levels varying from 1 to 5. FIGS. 2B, 2D, and 2F present the values contained in the cumulative histogram having 3 rows and 5 columns (corresponding to the 5 intensity levels) after filling respectively of the first, of the second and of the third row. Progress for example from FIG. 2A to FIG. 2B occurs in the following manner by filling the element $T_A(1,1)$, the number of times that intensity values less than or equal to 1 appear in the first row of I' is counted; and then the element $T_A(2,1)$ is filled by counting the number of times that intensity values less than or equal to 2 appear in the first row of the image I', and such a mechanism is repeated for the element $T_A(3,1)$, $T_A(4,1)$ and $T_A(5,1)$.

This pre-calculation is very fast and is carried out in a single sweep of all the mesh cells of the image I' obtained after rotation of the image I. Moreover, the resulting cumulative histogram is organized as a function of possible thresholds for the image I' since an element $T_A(i,j)$ provides information directly on the mesh cells of the row j of the image I' whose values are at most equal to the threshold value i.

Generally, $T_A(s_n)$ is defined by the set of elements of the cumulative histogram that are representative of the number of intensity levels of the image I' that are less than a threshold value sn. In the case of a 2D image and in the case where the favored direction is a straight line parallel to one of the rows j of the image I', with $T_A(s_n)$ corresponding to the $s_n$th column of the cumulative histogram $T_A$. In the case of a 3D image, $T_A(s_n)$ can correspond to a plane in the cumulative histogram $T_A$.

According to one embodiment of the present invention, for which the projections have been acquired via a non-parallel acquisition geometry, a projection matrix is defined which is dependent on the measurement of angle A being considered and which maps each point of the image I to an element of the cumulative histogram $T_A$. Next, each point of the image I is traversed to fill the cumulative histogram $T_A$ in the same manner as in the case of the parallel acquisition geometry described previously.

2). Estimation of the Values of the Intensity Thresholds

In the course of this step, in using automatic manner a number NS of values of intensity thresholds of an image is determining with the number NS of thresholds being an integer greater than or equal to 1, which is predefined. According to the invention, this problem is solved by searching for the NS values of thresholds making possible minimizing an objective function F measuring at least the difference between the actual projection P according to the angle A and the projection $P_A'$ simulated for the angle A and calculated based on the distribution representative of the intensity levels in the image I.

According to one embodiment of the present invention, a projection $P'_A$ of angle A is calculated, simulated based on the cumulative histogram $T_A$ of angle A calculated in an embodiment of the previous step according to a formula of the type:

$$P'_A = f(T_A(s_1), \ldots, T_A(s_n), \ldots, T_A(s_{NS}))$$

where f is a linear combination, $T_A(s_n)$ is the set of elements of the cumulative histogram $T_A$ of angle A that are representative of the number of intensity levels of the image I' that are at most equal to a threshold $s_n$, with n varying from 1 to NS.

According to one embodiment of the present invention, the projection $P'_A$ of angle A is calculated and is simulated based on the cumulative histogram TA of angle A calculated in an embodiment of the previous step in the following manner:

in the case of a single threshold $s_1$ (case where NS=1):

$$P'_A(j) = c^*_1 \cdot T_A(j,s_1) + c^*_2 \cdot (W - T_A(j,s_1))$$

where $c^*_1$ and $c_2^*$ are the intensities representative of the two classes delimited by the threshold $s_1$;

in the case of two thresholds $s_1$ and $s_2$, with $s_1 < s_2$ (case where NS=2):

$$P'_A(j) = c^*_1 \cdot T_A(j,s_1) + c^*_2 \cdot [W - T_A(j,s_1)]$$

where $c^*_1$, $c^*_2$ and $c^*_3$ are the intensities representative of the three classes defined by the thresholds $s_1$ and $s_2$;

in the case of NS thresholds $s_1$ to $s_{NS}$, with $s_n < s_{n+1}$ and n varying from 1 to NS:

$$P'_A(j) = c^*_1 \cdot T_A(j,s_1) + c^*_2 \cdot [T_A(j,s_2) - T_A(j,s_1)] + \ldots + c_{i+1}^* \cdot [T_A(j,s_{n+1}) - T_A(j,s_n)] + \ldots + c_{NS+1}^* \cdot [W - T_A(j,s_{NS})]$$

where $c_1$ to $c_{N+1}$ are the intensities representative of the NS+1 classes defined by the thresholds $s_1$ to $s_{NS}$.

According to one embodiment of the present invention, a least squares procedure is used to determine the NS intensity thresholds sought for a given projection $P_A$ of angle A. More precisely, the NS intensity thresholds are determined for a given projection $P_A$ of angle A which minimizes a difference between the projection $P_A$ as actually measured and the projection $P'_A$ simulated such as described previously. The objective function describing this inverse problem can then be written in the following manner:

$$F = \sum_{j=1}^{H} (P'_A(j) - P_A(j))^2 \quad (1)$$

The objective function thus as defined is nonlinear with respect to the intensity thresholds. Consequently, no direct procedure exists for obtaining the values of the intensity thresholds which are sought.

According to one embodiment of the present invention, the optimal intensity threshold values are determined by a trial and error procedure. This means that the objective function is evaluated for various combinations of values of the NS thresholds, and the combination of values of the NS thresholds leading to a minimum objective function value is preserved. The use of a trial and error procedure can be advantageously used in the case where only 1 or 2 thresholds have to be determined. Thus, in the case of a single threshold s1, it is possible to test all the possible threshold values and retain the value for which the objective function is a minimum. In the case of 2 thresholds s1 and s2, it is possible to fix for example a value for s1, and then to vary s2 through all the possible values except that taken by s1, and to calculate the value of the objective function for each pair (s1, s2); then this process is repeated for all the possible values of s1. The threshold values retained for an optimal segmentation of the image of the object considered are then those of the combination (s1, s2) offering a minimum objective function value. The possibility of testing a large number of possible combinations for the values of the NS thresholds which are sought by a trial and error procedure is made possible by virtue of the pre-calculation, such as defined in the previous step, based on the estimation of a distribution representative of the intensities. Indeed, this pre-calculation is performed just once, and expressing the simulated projection $P'_A$ as a function of this pre-calculation affords fast access to the simulated projections $P'_A$, for any combination of threshold values, in contradistinction to the prior art which must simulate projections $P'_A$ numerically (this being expensive in terms of calculation time), and do so, what is more, at each iteration of the optimization process (that is to say at each tested combination of thresholds).

According to another embodiment of the present invention, a procedure for minimizing the objective function based on an iterative approach is employed. More precisely, a procedure is used which, based on an objective function calculated on an initial model (here an initial value for each of the NS thresholds), will modify this model (that is to say the values of the NS thresholds), iteration after iteration, until a minimum of the objective function is found. Numerous objective function minimization algorithms are known, such as the Gauss-Newton procedure, the Newton-Raphson procedure or else the conjugate gradient.

According to one mode of implementation of the present invention, once the NS thresholds have been determined, it is possible to calculate the NS+1 intensities representative of each of the NS+1 classes induced by the NS thresholds in the following manner:

$$\begin{pmatrix} c_1^* \\ \ldots \\ c_{NS+1}^* \end{pmatrix} = ({}^tXX)^{-1t}XP,$$

the matrix X being calculated in the following manner:
in the case of a single threshold $s_1$:

$$X=W[T(j,s)/W,1-T(j,s)/W]$$

in the case of two thresholds $s_1$ and $s_2$:

$$X=W[T(j,s_1)/W,T(j,s_2)/W-T(j,s_1)/W,1-T(j,s_2)/W]$$

in the case of NS thresholds $s_1$ to $s_{NS}$:

$$X=W[T(j,s_1)/W,T(j,s_2)/W-T(j,s_1)/W, \ldots ,T(j,s_{i+1})/W-T(j,s_i)/W, \ldots ,1-T(j,s_n)/W]$$

At the end of the minimization process, NS values are obtained for the NS intensity thresholds which are sought, as are the NS+1 values of the intensities representative of the NS+1 classes delimited by the NS intensity thresholds.

According to one embodiment of the present invention, threshold values of an image of an object are calculated independently for each projection $P_A$, such as described previously, that is for each measurement angle A being considered. Preferentially, one and the same number NS of thresholds is calculated whatever the measurement angle that is considered.

According to one embodiment, the optimal threshold values are calculated for the set of NA angles being considered, taking for example one of the estimated thresholds, or else the mean, the median, or any other combinations of all or some of the thresholds obtained for each projection.

According to another embodiment of the present invention, the NS intensity thresholds are determined for the set of measurement angles by minimizing the following cost function:

$$F = \sum_{A=1}^{NA} \sum_{j=1}^{H} (P'_A(j) = P_A(j))^2$$

that is the NS threshold values are determined for the set of angles A being considered by solving a global optimization problem, covering all the angles, and not by solving an angle-by-angle optimization problem.

3) Segmentation of the Image I

In the course of this step, the image of the reconstructed object is segmented by grouping the NI intensity levels of the image in question into NS+1 classes defined by the NS thresholds determined in the course of the previous step. Thus, for each mesh cell (i,j) of an image of an object, a search is conducted for the class to which the mesh cell considered belongs, as a function of the threshold values determined in the previous step.

According to one mode of implementation of the present invention, each mesh cell is allocated an intensity representative of the class to which it belongs. The representative intensity in question may be the mean of the thresholds delimiting the class, or else one of the thresholds, or any combination of the thresholds.

According to one embodiment of the present invention, each intensity class is allocated the values $c_1$ to $c_{N+1}$ of the intensities representative of the NS+1 classes determined according to one embodiment of the previous step. For example, in the case where NS=1, if the element I(i,j) has a value less than a value of intensity threshold $s_1$, then the value of the representative intensity $c^*_1$ is allocated to I(i,j). And in the case of NS=2, if $s_1<I(i,j)<s_2$, then the value of the representative intensity $c^*_2$ is allocated to I(i,j). An image segmented into NS+1 intensity classes and characterized by intensity values belonging to the set $\{c^*_1, \ldots, c^*_n, \ldots, c^*_{NS+1}\}$, is thus obtained.

Furthermore, the invention relates to a computer program product downloadable from a communication network and/or recorded on a tangible medium readable by a computer and/or executable by a processor, comprising program code instructions for the implementing of the method, when the program is executed on a computer.

Use of the Invention

The invention also relates to the use of the method according to the invention for the characterization of catalyst supports in the field of petrochemical refining. Indeed, the segmentation of the image of a catalyst support, obtained according to the invention, can help to better characterize the physico-chemical specifics of the constituent materials of the support.

The invention can also relate to the use of the method according to the invention in the field of oil exploration and exploitation, for the characterization of porous media. Indeed, the segmentation of the image of a rock sample, originating for example from a reservoir rock of an oilfield, can contribute to a better characterization of this rock sample (better knowledge of its porosity, of its permeability, etc.), and consequently can help to improve the exploitation of the oilfield studied.

The invention can also relate to the use of the method according to the invention for the characterization of arbitrary materials, for the non-destructive testing of an object or else for medical imaging.

Example of Application

Figure 3A:
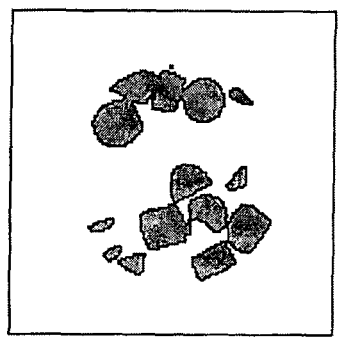
FIGS. 3A to 3C present results obtained by the method according to the invention.
Figure 3B:
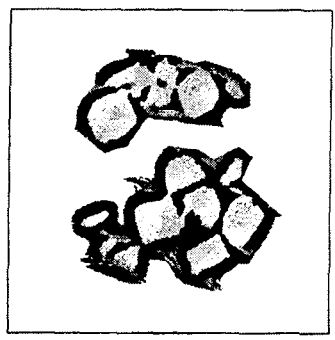
Figure 3C:
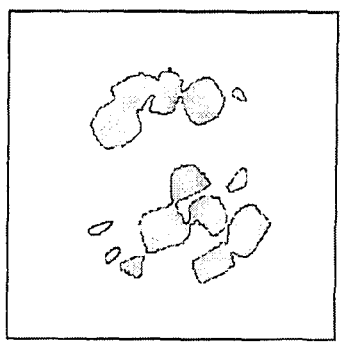

The present invention is applied to a synthetic object (that is to an object for which the exact solution of a segmentation is known) comprising two intensity levels (FIG. 3A). FIG. 3B presents the image I reconstructed with the aid of the SIRT tomographic reconstruction procedure, known and described in [Gilbert, 1972], on a basis of 140 projections P of the object being studied, which are obtained for angles varying between 0° and 139° in increments of 1°. The reconstructed image exhibits 255 intensity levels. Imperfections can be observed in this image (fuzzy effect), on account of the reconstruction of an object on the basis of a restricted amount of information on this object. FIG. 3C presents the result of the method according to the invention, applied to the image I and implemented in the case of a single intensity threshold. It is observed that the result of the method according to the invention does indeed lead to the simplification of the image studied into two very distinct classes. Thus, applied to this example, the method according to the invention makes it possible to correct the defect of resolution of the reconstructed image (FIG. 3B), with the simplified image (FIG. 3C) being closer to the object to be retrieved (FIG. 3A).

Thus, the method according to the invention allows automatic and fast determination of the values of optimal intensity thresholds, and thus makes it possible to simplify in a reliable manner the image of an object obtained by three-dimensional reconstruction. The present invention makes it possible to accelerate the step of segmentation by minimization of the distance to the projections by a pre-calculation performed on the image of the reconstructed object, which eliminates the calculations of simulated projections for each tested combination of thresholds, and then provides a procedure using this pre-calculation to calculate threshold values in an optimal manner.

The invention claimed is:

1. A method for segmentation of an image of an object represented by a finite number of intensity levels, the image being reconstructed based on measurements acquired external to the object from angles relative to a reference, based on predefined intensity thresholds of the image for at least one of the angles comprising steps of:

a) determining a distribution representative of the spread of the intensity levels of the image along a predetermined direction of at least one of the angles relative to the reference;

b) determining values of the intensity thresholds by minimizing an objective function estimating a difference between the measurement for the at least one angle and a simulated measurement for the at least one angle with the simulated measurement for at least one angle being dependent on values of the intensity thresholds and the distribution; and c) segmenting the image by grouping the intensity levels into intensity classes defined by the values of the intensity thresholds; and wherein the distribution is a cumulative histogram of the intensity levels in the image and the simulated measurement $P'_A$ for one of the angles A is calculated according to a formula:

$$P'_A = f(T_A(s_1), \ldots, T_A(s_n), \ldots, T_A(s_{NS}))$$

where f is a linear combination, NS is a predefined number of the intensity thresholds, and $T_A(s_n)$ is a set of elements of the cumulative histogram representative of a number of the intensity levels of the image that are less than a threshold value $s_n$ with the histogram being calculated for the angle A.

2. The method as claimed in claim 1, wherein the predetermined direction is a straight line parallel to a horizontal axis of the image.

3. The method as claimed in claim 1, comprising acquiring the measurements external to the object within a framework of a parallel acquisition geometry and determining in which the cumulative histogram occurs by a rotation of the image according to the at least one angle.

4. The method as claimed in claim 2, comprising acquiring the measurements external to the object within a framework of a parallel acquisition geometry and determining in which the cumulative histogram occurs by a rotation of the image according to the at least one angle.

5. The method as claimed in claim 1, determining a representative intensity for each of the classes delimited by the values of the intensity thresholds.

6. The method as claimed in claim 2, determining a representative intensity for each of the classes delimited by the values of the intensity thresholds.

7. The method as claimed in claim 3, determining a representative intensity for each of the classes delimited by the values of the intensity thresholds.

8. The method as claimed in claim 5, wherein the representative intensity for each class is a value of one of the thresholds delimiting the class, a mean of the values of the thresholds delimiting the class, or any linear combination of the values of the thresholds delimiting the class.

9. The method as claimed in claim 1, comprising applying steps a) and b) for each of the measurement angles for each of the measurements of external to the object and determining threshold values representative of the angles by choosing either a median, or a combination of the values of the thresholds determined for each of the angles.

10. The method as claimed in claim 2, comprising applying steps a) and b) for each of the measurement angles for each of the measurements of external to the object and determining threshold values representative of the angles by choosing either a median, or a combination of the values of the thresholds determined for each of the angles.

11. A method of characterizing catalyst supports in petrochemical refining with the method of claim 1.

12. A method of characterizing porous media for oil exploration and exploitation with the method of claim 1.

13. A method of characterizing materials for one of non-destructive testing of an object or for medical imaging with the method of claim 1.

14. A computer program product recorded on a tangible recordable medium for execution by a processor, comprising program code instructions for implementing the method of claim 1.

* * * * *